(12) United States Patent
Hilemon et al.

(10) Patent No.: US 10,855,633 B2
(45) Date of Patent: Dec. 1, 2020

(54) CONTROLLING ASSET MESSAGES

(71) Applicant: Computational Systems, Inc., Knoxville, TN (US)

(72) Inventors: Christopher G. Hilemon, Knoxville, TN (US); Anthony J. Hayzen, Knoxville, TN (US); William L. Sells, Knoxville, TN (US); Trevor Duncan Schleiss, Austin, TX (US); Manikandan Janardhanan, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 1337 days.

(21) Appl. No.: 14/879,686

(22) Filed: Oct. 9, 2015

(65) Prior Publication Data
US 2017/0104706 A1   Apr. 13, 2017

(51) Int. Cl.
*H04L 12/58*   (2006.01)
*H04L 12/24*   (2006.01)
(Continued)

(52) U.S. Cl.
CPC .......... *H04L 51/12* (2013.01); *H04L 41/0604* (2013.01); *H04L 51/14* (2013.01); *G06F 3/0481* (2013.01); *G08B 25/001* (2013.01); *H04L 43/0817* (2013.01); *H04W 4/44* (2018.02); *H04W 4/90* (2018.02)

(58) Field of Classification Search
CPC ...... G05B 19/0428; G05B 2219/24015; G05B 2219/24048; G05B 2219/24107; G08B 21/00; H04M 15/83; H04M 15/835; H04W 4/90; H04W 4/44; H04W 15/43
See application file for complete search history.

(56) References Cited

U.S. PATENT DOCUMENTS 9,159,217 B1 * 10/2015 Logan ................ G05B 19/042
2012/0258691 A1 * 10/2012 Baer ..................... G06F 3/0481
455/412.2

(Continued)

*Primary Examiner* — Barbara B Anyan
(74) *Attorney, Agent, or Firm* — Luedeka Neely Group, P.C.; Andy Neely; Rick Barnes

(57) ABSTRACT

A method of messaging control is implemented in a plant wide monitoring apparatus. A computer based framework infrastructure communicates with monitoring applications throughout the plant that are implemented on computers, monitors and computer-based applications. Sensors are placed on machinery and monitors receive sensor signals and generate event signals in response to defined physical occurrences, such as when vibration in a machine is exceeding a defined limit or a sensor is failing. A messaging application in the framework infrastructure generates messages corresponding to the event signals. The messages are transmitted to users based on send rules and suppression rules, which are user configurable. The send rules identify messages to be sent or not sent to a particular user based on characteristics of event signals. The suppression rules prevent the transmission of a message based on both the content of a particular event signal plus an external factor, such as a prior event signal. Suppression rules may suppress messages based on a repetitive characteristic in a series of event signals occurring within a specified time interval.

24 Claims, 1 Drawing Sheet

(51) Int. Cl.
　　　*H04L 12/26*　　(2006.01)
　　　*H04W 4/44*　　(2018.01)
　　　*G06F 3/0481*　　(2013.01)
　　　*G08B 25/00*　　(2006.01)
　　　*H04W 4/90*　　(2018.01)

(56) References Cited

U.S. PATENT DOCUMENTS

2012/0284208 A1* 11/2012 Blomqvist ............ H04M 15/43
　　　　　　　　　　　　　　　　　　　　　705/400
2015/0294553 A1* 10/2015 Logan .................. G05B 19/042
　　　　　　　　　　　　　　　　　　　　　340/539.1
2016/0031397 A1* 2/2016 Alamanos ............... H04W 4/90
　　　　　　　　　　　　　　　　　　　　　340/425.5

* cited by examiner

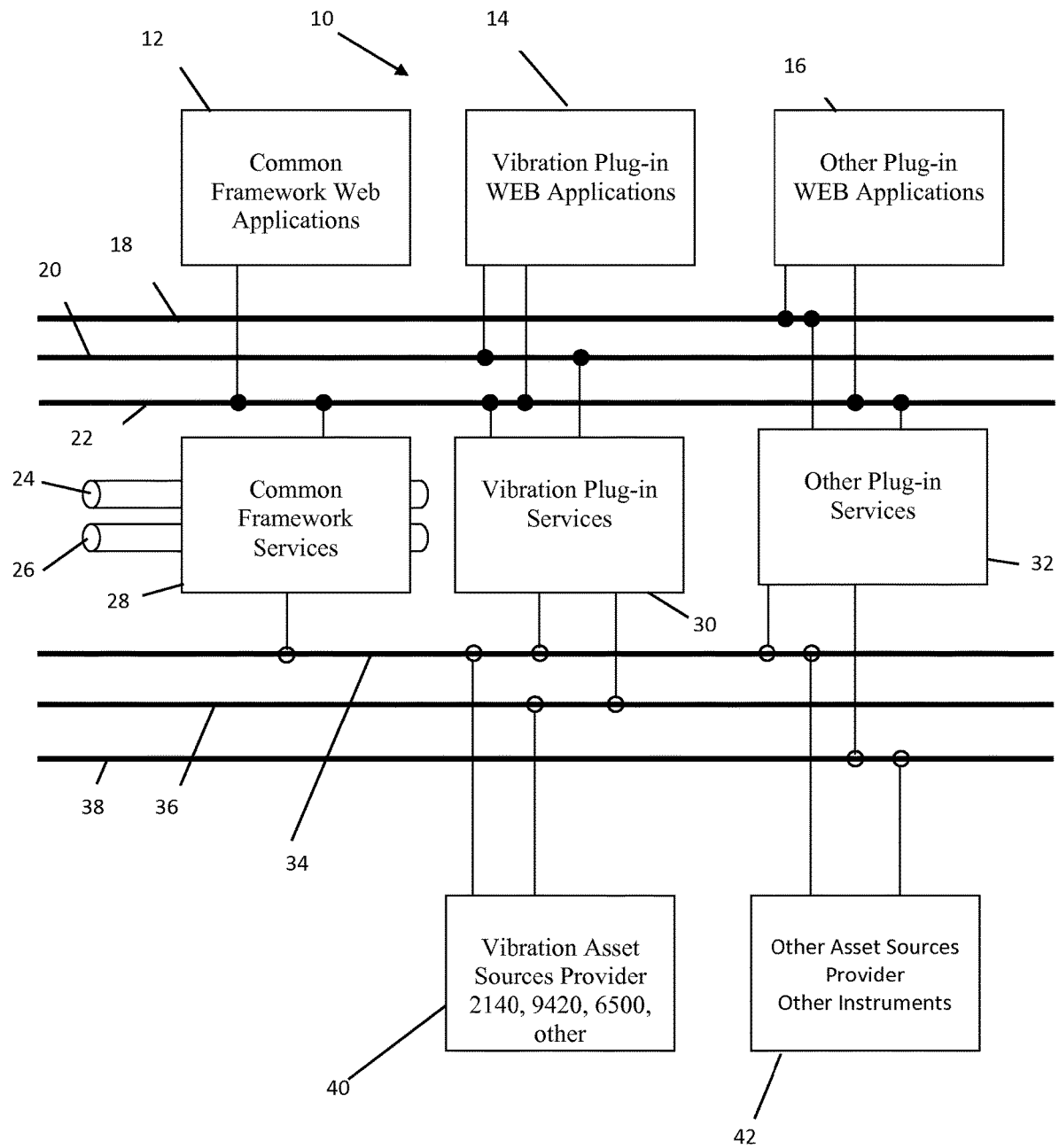

CONTROLLING ASSET MESSAGES

FIELD

The present invention relates to controlling asset messages and particularly relates to controlling messages regarding assets connected to an electronic monitoring system having a common framework infrastructure communicating with a variety of asset monitoring applications.

BACKGROUND

Electronic monitoring systems are used to monitor and typically control assets. For example, an electronic monitoring system may be used in a plant having numerous pieces of machinery and other equipment that need to be monitored. The plant may include motors, pumps, heat exchangers and valves, all of which may be generically called "assets", and one or more monitor may be attached to each of these assets for monitoring one or more parameter of the asset. The monitors may be grouped together and serviced by different computer applications. For example, there might be one application for vibration monitoring, another application for temperature monitoring and yet another application for monitoring the position and operation of the valves. Each of these applications will produce a tremendous amount of data, and the applications will identify important occurrences which may be generically called "events". An event may be a physical thing such as the detection of vibration in a motor that exceeds an alarm level. An event may also be a temperature that is too high, a valve that is operating improperly, or the detection of a failed sensor. These events need to be reported to the users and each application will have some strategy for reporting such events. In a large plant it is imperative to control the reporting of such events or else the users could be overwhelmed with information concerning events and the primary purpose of the monitoring system may be seriously compromised.

SUMMARY

In a large monitoring system where numerous monitors are placed on numerous assets governed by numerous applications, a large number of events will be reported and such events may create messages that are electronically directed to users. Various filtering techniques may be used to limit the number of messages that a particular user will receive. For example, a user who is only concerned with monitoring machinery, such as motors and pumps, would apply a filter to allow transmission of messages related to such assets. Also, filters would be applied to prevent other types of messages from being transmitted to this particular user. For example, a temperature alarm from a heat exchanger would not be sent to this particular user. However typical filtering techniques may be defeated by a spurious repeating signal. For example, a particular monitor may determine that a sensor has failed and because of a physical phenomenon in the sensor or because of a problem with the monitor, the monitor will repetitively report that the sensor has failed. For example, it may generate a message regarding sensor failure every 5 seconds. Even though this particular message is the type of message that a user wishes to receive based on his conventional filters, the present invention suppresses this spurious repetitive message to prevent a user from being overwhelmed with messages that may compromise his ability to pay attention to other messages of more importance. The user may control the suppression of these types of spurious repetitive messages by controlling suppression rules as discussed below.

As used herein, an event is an occurrence that has been detected and typically it is a physical occurrence such as a vibration in a machine reaching an alarm limit or a sensor that has failed. However, an event may also be a non-physical occurrence such a time. A monitor may detect or determine that it is time for a portable vibration analyzer to connect and download date collected by the analyzer from multiple assets. An event signal may be created by a monitor or an independent computer to indicate that the time has passed and no data has been received. The absence of something at a particular time is an event but it is not a physical occurrence.

An event signal is information related to the event and it is typically a digital signal containing information related to the event. A message is information created in response to an event signal and the message includes information related to the event signal. The message may include information that was contained in the corresponding event signal and it may include information taken from other sources. The use of this terminology (event, event signal, and message) is not universal in the industry and, for example, a message may be called an alert, or the event signal may be called an alert, or the event itself may be called an alert. Other terminology may be used as well. The terminology used herein is not intended to imply any meaning beyond that defined in or required by this specification. Also, it should be understood that event signals and messages can take many different forms, structures and formats.

In accordance with one particular embodiment, a method for monitoring assets is provided for use in a monitoring apparatus that monitors a large number of assets in a facility such as a plant. The monitoring apparatus includes a common framework infrastructure that provides services to one or more applications that operate one or more monitors. The framework infrastructure communicates with each of the various applications, but the applications normally cannot communicate directly with each other. The monitors include sensors that sense parameters of assets and report those parameters back to the applications. The monitors or the applications analyze the signals from the sensors and determine when a physical event has occurred and an event signal is generated and communicated by each application to the framework infrastructure. Thus, the method for monitoring the assets includes the steps of generating event signals based on signals from monitors that are sensing parameters of assets. Each event signal typically includes at least information corresponding to an asset instance, an event type and an event description. As used herein, and an asset instance relates to a particular asset as a whole or a point on a particular asset. For example, if 10 monitors are placed on a particular asset monitoring 10 parameters, each of the 10 monitors would relate to or constitute an asset instance. In addition, all 10 monitors as a whole may constitute an asset instance.

The event signals are transmitted to a messaging application which is located in the framework infrastructure. Thus, numerous applications operating numerous monitors will each send event signals to the messaging application in the framework infrastructure. Send rules are stored in the framework infrastructure that identify messages by send criteria and identify users that should receive messages based on the send criteria. In addition, suppression rules are stored by the message application in the framework infrastructure. The suppression rules identify suppression criteria that define messages that are otherwise valid but should be suppressed. A user input is provided to allow a user to access and modify the send rules and the suppression rules. By modifying the send rules a user can select messages that will be transmitted to this particular user according to the send criteria and that the user can also select messages that will be suppressed and not sent to the user according to the suppression criteria. A particular set of send rules and a particular set of suppression rules are stored for each user. When event signals are received, messages are generated corresponding to the event signals and are transmitted according to the send rules and the suppression rules. The messaging application identifies a set of users who should receive each message based on the particular sets of send rules and the particular sets of suppression rules. Therefore, a particular user is included in the set of users to receive the message if the message satisfies the particular set of send rules for the particular user and does not satisfy the particular set of suppression rules for the particular user. After identifying a set of users to receive the message, each message is sent to the set of users.

In one embodiment the suppression rules include a time interval suppression rule for temporarily suppressing messages from an asset instance when the number of event signals from the asset instance in a specified time interval exceeds a specified number limit. The time interval suppression rule may include a time limit and the suppression rule will suppress a particular defined message only for a period of time defined by the time limit. After the time limit expires, the messages will not be suppressed by the time interval suppression rule.

In accordance with a particular embodiment, a time interval suppression rule may include a set of asset instances, a set of event types, a specified time interval and a specified number of messages. New messages corresponding to a particular asset instance are suppressed by the time interval suppression rule only if (1) the particular asset instance is within the set of asset instances, (2) the specified number of events corresponding to the particular asset instance occur within the specified time interval, and (3) each of the events within the specified time interval were an event type within the set of event types. In one variation of this embodiment, new messages are suppressed only if each of the events within the specified time interval is the same type of event.

In any of the embodiments described herein, a user report may be sent to each user providing the number of suppressed messages during a specified time interval. The messaging application will keep a log of all event signals that were received. Thus, if desired, the user may receive a report indicating the identity of all event signals that were suppressed during a particular specified time interval.

The send rules may also include responsibility rules that define multiple spans of responsibility. The user may configure the send rules to select a particular responsibility rule. Thereafter, that user will receive messages only when the messages fall within the particular span of responsibility. Likewise, the user input is also configured to allow the user to select a particular set of asset instances. Once the user makes such selection, only messages related to those particular asset instances will be set to the user.

The suppression rules may also include a time-description suppression rule for suppressing messages if the following conditions are met: (1) the number of event signals from the asset instance in a specified time interval exceeds a specified number limit and (2) each of the number of event signals in the specified time interval has the same event description. The time-description suppression rule suppresses a new message only if an event signal associated with the new message includes the same event description.

Likewise, the suppression rules may include a time-value suppression rule. In this embodiment, each event signal may include a value corresponding to a parameter sensed by a monitor. The time-value suppression rule will suppress messages from an asset instance if the following conditions are met: (1) the number of event signals from the asset instance in a specified time interval exceeds a specified number limit, and (2) each of the event signals in the specified time interval has substantially the same value, which is a value within a specified value range of all other values of all other event signals in the number of event signals in the specified time interval. The time-value suppression rule suppresses a new message only if an event signal associated with the new message includes said substantially the same value.

The above rule may be stated more generally as follows. Each event signal may include an item of data and a time-item suppression rule will temporarily suppress messages from an asset instance if the following conditions are met: (1) the number of event signals from the asset instance in a specified time interval exceeds a specified number limit and (2) each of the event signals in the specified time interval has an item that is substantially the same, which is an item within specified range limits of all other items of the number of event signals in the specified time interval. The time-item suppression rule suppresses a new message only if an event signal associated with a new message includes said substantially the same item.

In yet another aspect of the present invention a particular event signal or a particular type of event signal may be flagged either by the messaging application or by the applications external to the framework infrastructure. The messaging application will generate a message for each flagged event signal. However, the suppression rules may be configured by the user to suppress messages even if they are based upon the flagged event types.

BRIEF DESCRIPTION OF THE DRAWINGS

Further advantages of the invention are apparent by reference to the detailed description when considered in conjunction with the FIGURE which is a somewhat diagrammatic illustration of one computer apparatus in which the message control and suppression method of the present invention may be implemented.

DETAILED DESCRIPTION

In accordance with the present invention, a method of controlling and suppressing messages may be implemented in a plant-wide computer apparatus 10 as shown in the FIGURE. The computer apparatus provides communication throughout one or more plants in order to monitor and control various assets, such as machinery, heat exchangers, pipelines, liquids, fluids, and solids. Referring to the FIGURE, the computer apparatus 10 includes common framework web applications 12 connected to a common framework API (application program interface) 22, and common framework services 28 are also connected to the common framework API 22. The framework services 28 include a services bus 24 and a data highway bus 26. The aforementioned "framework" elements are collectively referred to as the framework infrastructure.

In a typical application, such as a plant, numerous applications, services and buses are provided external to the framework infrastructure. For example, vibration plug-in web applications 14 may be connected to a vibration API 20 and the common framework bus API. Likewise other plug-in web applications 16 may be provided and connected to the common framework API 22 and to and other plug-in web API, and other plug-in services 32 may be connected to all three API's 22, 20 and 18. The "other" elements will be understood to represent numerous other applications, services and buses that may be provided in this particular computer apparatus 10.

Also connected to the common framework services 28 are vibration asset sources 40 and other asset sources 42, both of which are connected through the framework web API. The vibration asset sources 40 are also connected to a vibration API 36 through which the various sources may communicate to each other. The vibrations sources may include vibration collecting and monitoring devices such as models 2140, 9420, 6500, and others provided by Emerson® Process Management. The vibration asset sources 40 may communicate through API 36 with the vibration plug-in services 30, and the other asset sources communicate with the other plug-in services 32 through and other API 34. In this particular example, the other plug-in services 32 and the other asset sources 42 are connected to all three APIs 34, 36 and 38, which may be desirable, but is optional. In general, the applications, such as vibration plug-in web application 14 and the sources, such as source 40 will not talk to other applications or other services. Instead, everything will communicate to the common framework services 28 and communications between applications or between sources will be accomplished through the common framework services 34.

The details of the computer apparatus 10 are not necessary for the understanding of the current application. In this particular example, the common framework web applications include a messaging application. All asset sources, such as sources 40 and 42 may communicate to the messaging application through the common framework services 28. Thus, when something important happens as determined by the asset sources, an event signal may be generated by the asset sources and communicated through the common framework services 28 to the messaging application within the common framework web applications 12. Thus, in general, event signals are generated outside of the framework infrastructure and messages are generated by a messaging application within the framework infrastructure.

Examples of events that will cause an event signal to be created include a sensor failure for a monitoring device, a measurement data value that exceeds an alarm threshold either in the monitoring device itself or in an analysis application. Events are classified into types and each event signal includes identifying information which includes the event type and a description of the event. In addition, events or event types can be flagged to inform the framework infrastructure that a message should be generated when this event or this type of event is received by the framework. Thus, flags may be applied to event signals by the asset sources 40 and 42 external from the framework infrastructure, or event signals can be received by the framework infrastructure and analyzed. The framework infrastructure itself may apply the flag based on its analysis. Ultimately whether or not an event or an event type should create a message is user configurable, and such configuration may be done within the framework infrastructure itself For example, the messaging application within the common framework web applications may be programmed to allow user configuration and thereby determine what events or event types will create a message.

An important characteristic of events is that they are associated with an instance of an asset. The terminology "instance" is typically associated with a particular monitor sensor of an asset. For example, if a particular asset is monitored by 10 different sensors, the signal generated by each sensor is considered an instance of that asset. If a particular sensor generates a signal that will create an event, that event will be associated with a defined "instance" that is associated with a particular sensor. In addition, instances can be created by multiple sensors. For example, if multiple sensors generate vibration data that is analyzed by a monitor, and that monitor determines that an event has occurred, such event will be associated with an instance that is not uniquely associated with any particular sensor. In this example, the instance would be associated with a particular monitor and a particular asset, but not any particular sensor. Thus, an asset instance is associated with an asset and is a characteristic of an asset, but it is not necessarily associated with any physical position on the asset. Thus, the event signal will typically include the identification of an asset instance, a type and a description at minimum. This information will be used in generating messages related to the asset and the asset instance.

There are other sources of messages besides those generated by events. Messages may also be generated by users and those messages are typically not subject to the control of message control rules. In particular, those messages are not typically subject to the message suppression rules described below.

The messaging application provides various ways in which users may determine which messages they receive. For example, the messaging application may include an option for message subscriptions and another option for designating a span of responsibility for a particular user. Thus, using a user input, a user may select a particular subscription or a particular span of responsibility that will quickly determine which messages the user will and will not receive. In addition, users may subscribe or unsubscribe to events that have been flagged to generate messages. While these mechanisms limit the number of messages that a particular user will receive, they are also defining the messages that a user will receive based on the characteristics of the message alone. These mechanisms or methods are referred to herein as send rules because they are defining the rules that determine which messages should be sent. In a sense, the send rules are also suppression rules because they are rules that directly or indirectly select messages that should not be sent to a particular user. However, as used herein, a suppression rule will refer to a rule that depends upon the characteristics of an event alone plus something external to the characteristics of a particular event. For example, a suppression rule could depend upon the characteristics of two events. If two identical messages are generated based upon two identical events, the first of the identical messages may be sent and the second of the identical messages may be suppressed because a suppression rule has been selected requiring that duplicate messages should not be sent. Thus, even though the two messages are identical, one is sent and one is suppressed. The suppression rule in this example does not act upon the characteristics of the message alone or the event alone, and something else is being considered. In this case the second message is suppressed because the message is identical to a prior message, or because the event was identical to a prior event, excluding time characteristics.

The messaging application also includes the capability of relaying messages up a hierarchal structure. If a message is suppressed, it will not be relayed up the hierarchal structure.

As event signals are received by the common framework web applications, the data from the event signals are logged regardless of whether a message is generated. If a message is sent to particular users, the users who received the messages for particular events are also stored in memory or logged. Likewise, when an event should create a message for a particular user, but that message was suppressed by the suppression rules, the event is logged and it is notated that a particular user did not receive the message because of suppression rules. The rule that suppressed the message may also be logged. In this manner, a particular user may query the messaging application and determine what messages were suppressed that would otherwise have been sent to the user but for the suppression rules. Then, the user can examine the log of events corresponding to suppressed messages.

Messages may be accessed by computers directly or indirectly interfaced with the framework infrastructure. The framework infrastructure may be interfaced with other networks, including the Internet. Thus, messages may be received and displayed on mobile devices such as an iPhone or an android device. Messages may have images, videos, voice and other sound recordings, among other potential attachments, to supplement the basic message text with more information. For example, these attachments may be used to show an image of a failed part or an oil leak, a video of a loose vibrating cover with accompanying sound, and a voice recording describing the situation.

The number of messages that a user receives is initially controlled by rules configured by a user that may be characterized as send rules. Examples of send rules would be span of responsibility rules and message subscriptions. Suppression rules configured by the user may also be used to further reduce the number of messages received by a particular user. The suppression rules are used to identify situations where a message would normally be received by a particular user, but external occurrences are used to determine that the message is not sent to a particular user. If a monitoring device has malfunctioned and is creating a stream of events at messages, a particular user may wish to suppress at least some of the messages. As an example, a liquid sensor that is too sensitive to level changes in the liquid may send out a continuous stream of events based on minute level changes. As another example, a poorly designed device whose sensor has failed may send out a continuous stream of events indicating only that the sensor has failed. Yet another example is an application that is monitoring the alarm condition of the fluctuating measurement value in the alarming system either does not incorporate hysteresis or the hysteresis level is set too low such that a large number of messages are generated by harmless hysteresis.

In order to identify spurious or excessively duplicative messages, a time interval suppression rule may be implemented. The time interval suppression rule examines events as they are received by the messaging application and determines whether a particular item repetitively appears in a series of events within a limited time interval. An item may be exactly repeated in some situations. For example, if many events in a limited time interval are identified by the same asset instance, the identity of the asset instance will be identical each time. However, a repetitive item may also occur where there is not exact repetition. For example, if an event includes a particular sensor value, and that sensor value falls within a defined range of values repetitively, such sensor values may be considered repetitive even though the sensor values are not identical one to the other.

One type of suppression rule monitors the number of events that identified the same asset instance. If X number of events in a predetermined time interval identified the same asset instance, then the suppression rule will begin to suppress messages for any event that includes that particular asset instance. The suppression will continue for a limited period of time, for example one day. Then, the process will repeat itself. Assuming a stream of events is continuing to identify the same asset instance, then X number of messages will be generated and sent to the user. Assuming those X number of events occur within a predetermined time interval, suppression will start again and will again last for one day.

Another type of suppression rule would monitor the number of events that identify the same asset instance and the same type of event. If X number of events in a predetermined time interval identified both the same asset instance and the same type of event, then the suppression rule will begin to suppress messages for any future event that includes both the same asset instance and the same type of event.

Another type of suppression rule would monitor the number of events that identified the same asset instance and substantially the same sensor value. A sensor value is substantially the same if it falls within a defined range of a prior sensor value or values. Thus, if X number of events are received in a predetermined time interval having the same asset instance and having substantially the same sensor value, messages for future events having those characteristics will be suppressed for a limited period of time.

Each user may configure his or her set of suppression rules. For example, a user may select a particular asset instance or a number of asset instances for which the number of messages is to be controlled. If desired, that may be the only criteria for suppressing the messages. However, the user may also select a type of message that will be suppressed if it becomes repetitive. Likewise, the user may select a number of asset instances and a number of types of events to be suppressed. Thus, in order to be suppressed, the events must include a particular asset instance and a particular type. Both the asset instance and the particular type must be within the set chosen by the user to create the suppression based on the asset instance and type criteria.

The default time limit for suppression is one day. However, the user may configure the time limit of suppression. After messages are suppressed for the time limit, that particular suppression rule will be reset. Suppression under that particular rule will begin again only if the conditions of the suppression rule are met again.

The default number for X is 10, where X is the number of messages that will be sent before suppression begins. However, the user may select a value for X as well. The default start time for beginning the application of the suppression messages is midnight, but the start time may likewise be selected by the user. The suppression rules begin counting the number of messages that meet the suppression criteria beginning at the start time. If during the time interval the number of messages meeting a suppression criteria exceeds the limit, then no more messages will be generated for events having the specified characteristics of the criteria until the time limit is reached. So for example, if a user configures his suppression rules to suppress events from asset instances 1 through 10, if they have a type A, the suppression rules will begin at the start time to count events having asset instances 1 through 10, if and only if those events have a type A. If the suppression rule determines that X number of events occurred during the time interval having asset instance 2 and having type A, then the suppression rule will be triggered and no messages will be generated in the future based on events having asset instance 2 and having type A, until the time limit is reached (such as one day).

As mentioned previously, the messaging application is continuously logging event signals as they are received. In addition, the number and the identity of events for which messages were suppressed are also logged. At the end of the time limit, the user will be sent a message providing a report as to the number of messages suppressed. The report may also include details as to the identity of events for which the messages were suppressed. At that point, the user can log on to the messaging application and query the event log to determine more information about the suppressed messages if desired. If the situation that created the repetitive event is not prepared, at the end of the time limit the user will have to restart the process of suppressing messages. Or, alternatively the process will restart automatically and the suppression rules will be reset. After a reset, the suppression rules will suppress messages only if their criteria is met. Also, the system administrator has the ability to turn off any suppression rule so that messages will be received by particular users even if they have selected suppression rules that would ordinarily prevent the messages from being sent.

The suppression rules of the present invention as described above are particularly useful in protecting a user from a barrage of repetitive messages that might obscure an important message. The suppression rules may be configured simply to suppress any kind of repetitive message, or the suppression rules may be configured with more than one criteria that must be met in order to satisfy the rule. This more complicated configuration of the suppression rules will allow a more sophisticated and detailed control of suppression. For example, a user might select a group of asset instances for which he wishes to suppress messages of a particular type, such as sensor failure. However, the user may wish not to suppress messages from this group of asset instances if the type of message indicates an alarm condition unrelated to sensor failure. Thus, the user would require that the suppression rule would be activated only when the asset instance fell in the group and the message type was simply a sensor failure. Messages based on events from the asset instances, even repetitive messages, would continue to be sent unless both conditions were met. Thus, the combination of send rules and suppression rules gives the user maximum flexibility in determining the number of messages that the user will receive as well as the characteristics of messages that the user will receive. In this manner, each user can tailor the messaging application to his particular circumstance.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for monitoring assets comprising:
generating event signals based on signals from monitors that are sensing parameters of assets, each event signal including information corresponding to an asset instance, an event type and an event description;
transmitting the event signals to a messaging application; that identify messages by send criteria and identify users that should receive messages based on the send criteria;
storing message suppression rules that identify messages by suppression criteria, the suppression rules including a time interval suppression rule for suppressing messages from an asset instance when the number of event signals from the asset instance in a specified time interval exceeds a specified number limit;
providing a user input for accessing and modifying the send rules and suppression rules based on user input so that a user can select messages that will be transmitted to the user according to the send criteria and a user can select messages that will be suppressed and not sent to the user according to the suppression criteria;
storing a particular set of send rules and a particular set of suppression rules for each user;
generating messages corresponding to the event signals;
identifying a set of users who should receive each message based on the particular sets of send rules and the particular sets of suppression rules, a particular user being included in the set of users if the message satisfies the particular set of send rules for the particular user and does not satisfy the particular set of suppression rules for the particular user; and
transmitting each message to the set of users that were identified in the identifying step.

2. The method of claim 1 wherein the time interval suppression rule includes a time limit and messages are suppressed by the time interval suppression rule only temporarily for the time limit.

3. The method of claim 1 wherein the time interval suppression rule includes a time limit and messages are suppressed by the time interval suppression rule only temporarily for the time limit and wherein a message is sent to the user at the end of each time limit, the message providing the number of messages suppressed by the time interval suppression rule.

4. The method of claim 1 wherein one or more of the specified asset instances, the specified time interval and the specified number limit are user defined based on user input.

5. The method of claim 1 wherein:
the suppression rules include a time interval suppression rule for temporarily suppressing messages, the time interval suppression rule including a set of asset instances, a set of event types, a specified time interval, and a specified number of messages, and
new messages corresponding to a particular asset instance are suppressed by the time interval suppression rule only if (1) the particular asset instance is within the set of asset instances, (2) the specified number of events corresponding to the particular asset instance occur within the specified time interval, and (3) each of the events within the specified time interval were an event type within the set of event types.

6. The method of claim 5 wherein new messages corresponding to a particular asset instance are suppressed only if each of the events within the specified time interval were the same event type and were within the set of event types.

7. The method of claim 5 wherein the providing step further comprises providing a user input enabling the user to define a start time for the specified time interval.

8. The method of claim 5 wherein the providing step further comprises providing a user input enabling the user to define the set of asset instances and the set of event types.

9. The method of claim 1 wherein the send rules include responsibility rules defining multiple spans of responsibility, wherein the user input is configured to allow the user to select a particular responsibility rule, and wherein the set of users for receiving each message is based in part on the selected responsibility rules.

10. The method of claim 1 wherein the send rules include subscription rules defining multiple sets of messages to which a user may subscribe, wherein the user input is configured to allow the user to select a subscription rule defining a particular set of messages, and wherein the set of users for receiving each new message is based in part on the selected subscription rules.

11. The method of claim 1 wherein the step of providing a user input further comprises providing a user input configured to allow the user to select a set of asset instances and only messages corresponding to the selected set of asset instances may be suppressed by the suppression rules.

12. The method of claim 1 wherein the step of providing a user input further comprises providing a user input configured to allow the user to select a set of event types for suppression and only messages corresponding to the selected set of event types may be suppressed by the suppression rules.

13. The method of claim 1 further comprising periodically sending a user a report as to the number of messages suppressed during a specified time interval.

14. The method of claim 1 further comprising keeping a log of all the events, periodically sending a user of a report as to the number of messages suppressed during a specified time interval and identifying the events in the log of events for which messages were suppressed.

15. The method of claim 1 wherein the suppression rules include a time-type suppression rule for temporarily suppressing messages from an asset instance if the following conditions are met: (1) the number of event signals from an asset instance exceeds the specified number limit in the specified time interval and (2) each of the number of event signals has the same event type.

16. The method of claim 15 wherein the time-type suppression rule suppresses a new message only if an event signal associated with the new message has the same event type.

17. The method of claim 1 wherein the suppression rules include a time-description suppression rule for temporarily suppressing messages from an asset instance if the following conditions are met: (1) the number of event signals from the asset instance in a specified time interval exceeds a specified number limit and (2) each of the number of event signals in the specified time interval has the same event description.

18. The method of claim 17 wherein the time-description suppression rule suppresses a new message only if an event signal associated with the new message includes the same event description.

19. The method of claim 1 wherein each event signal may include a value corresponding to a parameter value sensed by a monitor and wherein the suppression rules include a time-value suppression rule for temporarily suppressing messages from an asset instance if the following conditions are met: (1) the number of event signals from the asset instance in a specified time interval exceeds a specified number limit, and (2) each of the event signals in the specified time interval has substantially the same value, which is a value within a specified value range of all other values of all other event signals in the number of event signals in the specified time interval.

20. The method of claim 19 wherein the time-value suppression rule suppresses a new message only if an event signal associated with the new message includes said substantially the same value.

21. The method of claim 1 wherein event signals may include an item of data and wherein the suppression rules include an item suppression rule for temporarily suppressing messages from an asset instance if the following conditions are met: (1) the number of event signals from the asset instance in a specified time interval exceeds a specified number limit and (2) each of the event signals in the specified time interval has an item that is substantially the same, which is an item within specified range limits of all other items of the number of event signals in the specified time interval.

22. The method of claim 21 wherein the time-item suppression rule suppresses a new message only if the event signal associated with the new message includes said substantially the same item.

23. The method of claim 1 further comprising flagging particular types of event signals to produce flagged event signals and generating a message using the messaging application each time a flagged event signal is received by the messaging application.

24. The method of claim 23 wherein the flagging step comprises modifying the message rules for a particular user so that a message is generated and sent to the particular user for the flagged event signal if the message does not satisfy the particular set of suppression rules for the user.

* * * * *